United States Patent [19]

Gardner et al.

[11] Patent Number: 4,888,316

[45] Date of Patent: Dec. 19, 1989

[54] PREPARATION OF HYDROTREATING CATALYST FROM SPENT CATALYST

[75] Inventors: Lloyd E. Gardner, Bartlesville; Dennis R. Kidd, Dewey, both of Okla.

[73] Assignee: Phillips Petroleum Company, Bartlesville, Okla.

[21] Appl. No.: 274,156

[22] Filed: Nov. 21, 1988

[51] Int. Cl.$^4$ .................. B01J 21/20; B01J 23/94; B01J 23/92; B01J 23/88

[52] U.S. Cl. .................. 502/20; 208/216 R; 208/251 H; 502/22; 502/49; 502/52; 502/314; 502/322; 502/323; 502/332

[58] Field of Search .................. 502/20, 22, 49, 52, 502/45–48, 220, 314, 516, 517, 31,

[56] References Cited

U.S. PATENT DOCUMENTS

| | | | |
|---|---|---|---|
| 2,840,530 | 6/1958 | Milliken, Jr. et al. | 252/455 |
| 2,924,568 | 2/1960 | Anderson et al. | 208/264 |
| 3,676,330 | 7/1972 | Plank et al. | 208/111 |
| 4,007,131 | 2/1977 | Gillespie et al. | 502/52 |
| 4,026,821 | 5/1977 | Shoofs et al. | 502/48 |
| 4,111,832 | 9/1978 | Rohbock et al. | 252/412 |
| 4,536,281 | 8/1985 | Hettinger, Jr. et al. | 208/113 |
| 4,581,129 | 4/1986 | Miller et al. | 208/216 R |
| 4,657,663 | 4/1987 | Gardner et al. | 502/314 |
| 4,767,523 | 8/1988 | Kukes et al. | 502/9 |

FOREIGN PATENT DOCUMENTS

| | | | |
|---|---|---|---|
| 130793 | 5/1978 | German Democratic Rep. | 502/20 |
| 68890 | 6/1977 | Japan | 502/22 |
| 73193 | 6/1977 | Japan | 502/20 |

OTHER PUBLICATIONS

"Regeneration of Hydrotreating Catalysts", by Joseph F. Martin, Ketjen Catalysts, Fall 1984.

Primary Examiner—Paul E. Konopka
Attorney, Agent, or Firm—K. K. Brandes

[57] ABSTRACT

An active hydrotreating catalyst composition is prepared by a process comprising the steps of (a) grinding a spent hydrotreating catalyst containing carbonaceous deposits, (b) mixing the ground spent catalyst with an alumina-containing material (preferably alumina), (c) shaping (preferably extruding) the mixture of ground spent catalyst and alumina-containing material and (d) heating the shaped mixture so as to burn off carbonaceous deposits on the ground spent catalyst component. The thus-prepared active hydrotreating catalyst is used in a process for hydrotreating hydrocarbon containing feed streams (oils) which contain metal impurities.

32 Claims, 1 Drawing Sheet

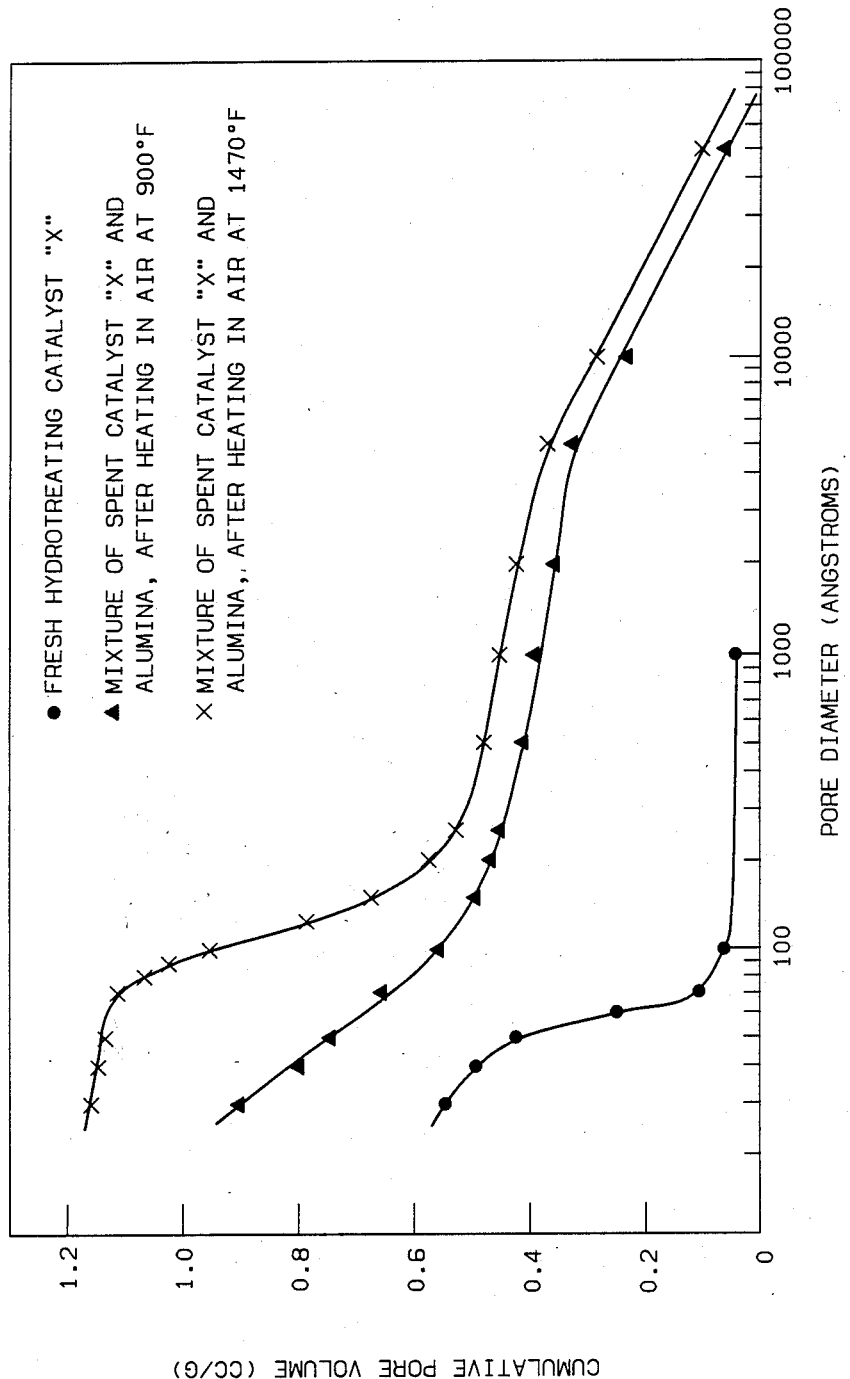
FIG.

PREPARATION OF HYDROTREATING CATALYST FROM SPENT CATALYST

BACKGROUND OF THE INVENTION

This invention relates to a method of preparing an active hydrotreating catalyst composition from a spent hydrotreating catalyst. In another aspect, this invention relates to an oil hydrotreating process employing a hydrotreating catalyst composition.

Commercial refining processes use large quantities of solid hydrotreating catalysts for upgrading crude oils and crude oil fractions. These catalysts become ineffective after extensive periods of time on stream, mainly due to coke and metal deposits, clogging of pores, poisoning of active sites, and the like. Generally these spent catalyst are discarded. This method results in disposal expenses, environmental problems (due to possible leaking of contaminants from the catalyst into the soil) and high catalyst replacement costs. Thus, there is an ever present need to find ways to regenerate and reuse spent hydrotreating catalyst rather than discarding them.

SUMMARY OF THE INVENTION

It is an object of this invention to prepare an active hydrotreating catalyst composition from a spent hydrotreating catalyst. It is another object of this invention to provide an active hydrotreating catalyst composition. It is another object of this invention to provide a process for hydrotreating a metal-containing oil employing said active hydrotreating catalyst composition. Other objects and advantages will become apparent from the described description and the appended claims.

In accordance with this invention, a process for preparing an active hydrotreating catalyst composition from a spent hydrotreating catalyst composition comprises the steps of:

(a) grinding a substantially dry (i.e., substantially free of water and liquid hydrocarbons) spent hydrotreating composition comprising (i) an alumina-containing support material, (ii) at least one compound (generally oxide and/or sulfide) of at least one metal selected from the group consisting of molybdenum, tungsten, nickel and cobalt, and (iii) solid carbonaceous deposits;

(b) mixing the ground spent hydrotreating catalyst composition obtained in step (a) with an alumina-containing material (preferably alumina);

(c) shaping the mixture obtained in step (b) into compacted (shaped) particles comprising said ground spent hydrotreating catalyst composition and said alumina-containing material; and (d) heating the compacted particles obtained in step (c) in a free oxygen containing gas under such conditions as to substantially dry the compacted particles, to convert (burn) said solid carbonaceous deposits to carbon oxides (CO, $CO_2$), and to obtain an active hydrotreating catalyst composition.

In a particularly preferred embodiment, mixing step (b) is carried out by dispersing the ground spent hydrotreating catalyst composition and alumina powder in a suitable liquid dispersion medium (preferably water) so as to obtain a paste; and shaping step (c) comprises extruding the paste. Also preferably, heating step (d) is carried out in two sub-steps:

(d1) substantially drying the compacted particles of ground spent hydrotreating catalyst composition and alumina at a first temperature so as to substantially dry the compacted particles, and (d2) heating the substantially dried compacted particles obtained in step (d1) in a free oxygen containing gas at a second temperature, which is higher than said first temperature, so as to substantially convert the carbonaceous deposits in component (ii) to carbon oxides and to obtain an active hydrotreating catalyst composition (i.e., being active for removal of sulfur and metal impurities from hydrocarbon-containing oils by hydrotreating).

In another preferred embodiment, the material obtained in step (d) or, alternatively, step (d2) is further heated in step (e) at a temperature which is higher than the maximum temperature used in step (d) or, alternatively, step (d2), so as to obtain an active hydrotreating catalyst composition containing a larger portion of pores in the 60–500 Å pore diameter range than the material obtained in step (d) or, alternatively, step (d2).

Also in accordance with this invention, there is provided a hydrotreating catalyst composition which has been prepared by the process comprising steps (a), (b), (c), (d) and, optionally, (e), as described above.

Further in accordance with this invention, there is provided a process for hydrotreating a liquid (i.e., liquid at the hydrotreating conditions) hydrocarbon containing feed, which also contains at least one metal impurity, comprising the step of contacting said feed with a free hydrogen containing gas and an active hydrotreating catalyst composition having been prepared by the regeneration process comprising steps (a), (b), (c), (d), and, optionally, (e), as described above, under such contacting conditions as to provide a liquid hydrocarbon containing product containing said at least one metal impurity (in particular compounds of nickel and/or vanadium) at a lower level than said feed.

BRIEF DESCRIPTION OF THE DRAWING

The FIGURE exhibits pore distribution curves for a fresh hydrotreating catalyst and for hydrotreating catalyst compositions which contain regenerated hydrotreating catalysts.

DETAILED DESCRIPTION OF THE INVENTION

The spent catalyst composition (also referred to as spent catalyst) used in steps (a) of the process of this invention can be any spent alumina-supported hydrotreating catalyst composition which comprises compound(s) of Mo and/or W and/or Ni and/or Co, and has been used in a prior oil hydrotreating (preferably hydrodesulfurization) process under such conditions as to such form solid carbonaceous deposits (i.e., coke or coke-like deposits which may contain some hydrogen bound to carbon) on the catalyst composition.

Generally, the fresh catalyst composition (i.e. the catalyst composition prior to its use in said prior oil hydrotreating process) from which the spent hydrotreating catalyst composition is derived, comprises the following parameters: a surface area SA (as determined by the B.E.T. method using nitrogen; carried out substantially in accordance with ASTM method D3037) of about 50 to about 400 $m^2/g$, preferably about 150 to about 350 $m^2/g$; a pore volume PV (as determined by mercury intrusion porosimetry; carried out at room temperature and a mercury pressure ranging from an initial pressure of 0 psig to a final pressure of 60,000 psi, using an Autopore 9200 instrument of Micromeritics, Norcross, Ga.) of about 0.2 to about 1.5 cc/g, preferably about 0.4 to about 1.0 cc/g; and an average pore diameter PD (calculated from the formula PD=4×PV÷SA) of less than 100 Å, preferably about 30 to about 100 Å, more preferably about 50 Å to about 80 Å. Generally the fresh catalyst composition contains a total of about 5 to about 20 weight percent promoter metal (i.e., Mo and/or W and/or Ni and/or Co), preferably about 2 to about 15 weight percent Mo (more preferably about 5-10 weight percent Mo), preferably about 1 to about 10 weight percent Ni (more preferably about 2-6 weight percent Ni), and preferably about 1 to about 10 weight percent Co (more preferably about 2-6 weight percent Co). Preferably, Pt, Pd and other Group VIII noble metals and compounds thereof are essentially absent from the catalyst composition. However, it is within the scope of this invention to have additional promoters present in the hydrotreating catalyst composition, e.g., compounds of Y, La, Ce, Ti, Zr, V, Cr, Mn, Re, Fe, Cu, Zn, P, B and the like.

The spent hydrotreating catalyst composition, derived from the above-described fresh catalyst composition and used as starting material in step (a), generally exhibits a lower surface area, a lower pore volume and a lower average pore diameter than the fresh hydrotreating catalyst composition. Specific ranges of surface area, pore volume and average pore diameter of the spent hydrotreating catalyst composition depend on the type of previous hydrotreating, the severity of previous hydrotreating conditions, and the types and levels of contaminants in the feed used in the prior hydrotreating in which the catalyst was used. The weight percentage of W and/or Mo and/or Ni and/or Co in the spent catalyst (excluding the weight of carbonaceous deposits) is about the same as in the fresh catalyst. However, the Ni content in the spent catalyst can be significantly higher, such as about 2-20 weight-% Ni if the hydrotreating feed contained relatively high levels of Ni contaminants. Furthermore, the spent catalyst can also contain compounds of vanadium and iron. The weight ratio of carbonaceous deposits (iii) on the spent catalyst composition to the sum of components (i) and (ii) of the spent catalyst composition can be in the range of from about 1:1000 to about 1:1, preferably about 1:100 to about 1:10.

Step (a) is carried out with a substantially dry, oil-free spent catalyst composition. The removal of liquids (hydrocarbon oil, water, solvents and the like) from the spent catalyst before step (a) can be carried out by any conventional drying means under any suitable conditions, such as heating in a substantially inert gas stream (e.g., $N_2$, He, Ar, methane, ethane, and the like), so as to evaporate and sweep away adhered liquids from the spent catalyst composition; or by pumping off adhered liquids under reduced pressure conditions; or by washing (extracting) adhered liquids from the spent catalyst with a suitable solvent, followed by pumping under reduced pressure conditions (so as to remove adhered solvent); and the like. The spent hydrotreating catalyst composition should be substantially free of flammable organic materials, before step (a) is carried out.

Grinding step (a) can be carried out in any suitable manner using conventional grinding equipment, generally a vibratory mill, a ball mill, and the like. A liquid (preferably water) can be present during the grinding operation, so as to assure effective fragmentation of the spent catalyst particles, without undesirable dusting.

The spent catalyst material can be ground to any suitable particle size, preferably to approximately a 40-250 mesh size. The ground material can be sieved before step (b), but this sieving step is not necessary.

The ground spent catalyst composition is then mixed in step (b) with an alumina-containing material, e.g., alumina, alumina hydrates, alumina-silica, alumina-$AlPO_4$, alumina-titania, and the like, wherein the alumina content in the mixture generally exceeds about 50 weight percent. Preferably the alumina-containing material consists essentially of alumina. Generally, the alumina-containing material (preferably alumina) has a surface area, measured by the BET method of Brunauer, Emmett and Teller using nitrogen, of about 50 to about 350 m²/g (preferably about 150-300 m²/g); and a pore volume, measured by mercury intrusion porosimetry, of about 0.3 to about 1.0 cc/g. The average particle size of the alumina-containing material generally is in the range of about 50 to about 325 mesh.

Mixing step (b) can be carried out in any manner, using conventional mixing equipment. Preferably a liquid (preferably water) is present during the mixing operation at such an amount as to provide a mixture having a pasty consistency, suitable for shaping step (c). Preferably, the weight ratio of the ground spent hydrotreating catalyst composition to the alumina-containing material is in the range of from about 1:50 to about 1:1, preferably from about 1:20 to about 1:4. The weight ratio of liquids (e.g., water) to solids (ground spent catalyst plus alumina-containing material) in step (b) generally is in the range of from about 0.01:1 to about 1:1, preferably about 0.1:1 to about 0.4:1.

The pasty mixture obtained in step (b) can be shaped in step (c) by any conventional shaping process, such as extrusion through at least one die (round or square or trilobal and the like) and subsequent cutting the extruded strand(s), or by pelletizing (using a disc pelletizer or a press or any other conventional pelletizing equipment), and the like. Generally, the size of the thus shaped particles is such as to provide particles in subsequent heating step (d) of such size as to make then suitable for use in fixed catalyst beds, as is well known by those skilled in the art.

Heating step (d) be carried out under any suitable conditions which result in the removal of liquids and in the oxidation of carbonaceous deposits from the shaped mixture obtained in step (c), and generally also in a conversion of metal sulfides (e.s., sulfides of Ni, V, etc.) to metal oxides. Generally, the temperature in step (d) is selected such that it is gradually increased from about 200°-300° F. (labeled "first temperature"), at which the material is substantially dried, to a temperature (labeled "second temperature") in the range of from about 700° to about 1000° F., preferably about 800° to about 950° F. The heating times (at the first and second temperatures) can vary considerably, depending on the temperature of heating step (d) and on the amount of liquids to be removed and carbonaceous deposits to be removed.

Heating step (d) is carried out in under oxidizing conditions, preferably in a free oxygen containing gas, such as air or nitrogen-diluted air, so as to oxidize the carbonaceous deposits on the spent catalyst component to carbon oxides ($CO_2$ and/or CO), and to substantially convert metal sulfides to metal oxides. Generally, heating step (d) is terminated when the amount of carbon oxides (CO and/or $CO_2$) in the off-gas is low enough to indicate that essentially all carbonaceous deposits have been burned off.

The product obtained in step (d) generally has the following parameters (determined as described above): a BET surface area in the range of from about 50 to about 300 m$^2$/g (preferably about 100–200 m$^2$/g), a pore volume in the range of from about 0.5 to about 1.5 cc/g (preferably about 0.8–1.2 cc/g), an average pore diameter in the range of about 50 to about 500 Å (preferably about 100–300 Å), and a pore volume in pores of 60–500 Å diameter in the range of from about 30 to about 90 percent (preferably about 40–80 percent) of the total pore volume. The product obtained in step (d) possesses good hydrodemetallization activity.

Optionally, an additional heating step (e) is carried out at a temperature which is higher than the second temperature of step (d). Generally, the temperature in step (e) is in the range of from about 1000° to about 1800° F., preferably about 1100°–1700° F., more preferably about 1200°–1500° F. The heating time of step (e) depends on the utilized temperature but generally is in the range of about 10 minutes to about 24 hours (preferably about 1–5 hours). This heating (calcining) step (e) can be carried out in an inert gas atmosphere or in an oxidizing gas atmosphere. Preferably, heating step (e) is carried out in a free oxygen containing gas atmosphere (such as air).

The catalyst composition obtained in step (e) generally has the following parameters (determined as described above): a surface area in the range of about 50 to about 300 m$^2$/g (preferably about 100–200 m$^2$/g); a pore volume in the range of about 0.5 to about 1.5 cc/g (preferably about 0.8–1.2 cc/g); an average pore diameter in the range of about 50 to about 500 Å (preferably about 100–300 Å), and a percentage of pores of 60–500 Å diameter in the range of about 35 to about 95 percent of the total pore volume. It is concluded that the product of step (e) has greater hydrodemetallization activity than the product of step (d), because of the higher pore volume of the 60–500 Å pores.

Metal promoter weight percentages in the calcined catalyst composition obtained in step (d) or (e) generally are in the range of about 0.5 to about 10 weight-% metal (i.e., Mo or W or Ni or Co, or a mixture of two or more of these metals), preferably about 2–6 weight-% metal. The total alumina content in this catalyst composition generally is in the range of from about 80 to about 99 weight percent, preferably about 90 to about 98 weight percent.

The calcined shaped catalyst composition comprising alumina-containing material and oxidized (regenerated) spent catalyst composition can be employed as a catalyst composition in a variety of hydrocarbon conversion processes, but is particularly effective as a catalyst composition in hydrofining processes employing metal-containing hydrocarbon-containing feed oils. In one preferred embodiment of this invention, the catalyst composition of this invention is used as a catalyst for hydrotreating substantially liquid hydrocarbon-containing feed streams which also contain compounds (mainly organic compounds) of nickel and/or vanadium and of sulfur as impurities. Generally coke precursors (measured as Ramsbottom carbon residue, ASTM D524) and nitrogen compounds are also present in these feeds. Suitable hydrocarbon containing feed streams include crude oils and fractions thereof, petroleum products, heavy oil extracts, coal pyrolyzates, liquefied coal products, products from tar sands, shale oil and shale oil products. The catalyst composition of this invention is particularly suited for treating petroleum residua such as heavy topped crudes and hydrotreated heavy oil residua, which generally have an initial boiling point (measured under atmospheric pressure) in excess of about 400° F., preferably in excess of about 600° F., and contain about 5–1000 ppmw (parts by weight of metal per million parts by weight of hydrocarbon-containing feed) vanadium, about 3–500 ppmw nickel, about 0.5–7.0 weight-% sulfur, about 0.2–2.0 weight-% nitrogen and about 1–30 weight-% Ramsbottom carbon residue. The API gravity (measured at 60° F.) of these feeds generally is about 5–25.

The hydrotreating process of this invention employing the active hydrotreating catalyst composition of this invention can be carried out in any apparatus whereby an intimate contact of the active catalyst composition with the hydrocarbon-containing feed stream and a free hydrogen containing gas is achieved, under such conditions as to produce a hydrocarbon containing product having reduced levels of metals (in particular nickel and/or vanadium) and sulfur. Generally, a lower level of nitrogen and Ramsbottom carbon residue and higher API gravity are also attained in this hydrotreating process. The hydrotreating process can be carried out using a fixed catalyst bed (presently preferred) or a fluidized catalyst bed or a moving catalyst bed or an agitated slurry of the regenerated catalyst in the oil feed (hydrovisbreaking operation). The hydrotreating process can be carried out as a batch process or, preferably, as a continuous process, more preferably in a tubular reactor containing at least one fixed regenerated catalyst beds or in a plurality of fixed bed reactors in parallel or in series. The hydrocarbon-containing product stream can be distilled, e.g., in a fractional distillation unit, so as to obtain product fractions having different boiling ranges.

The active hydrotreating catalyst composition of this invention can be used alone in the hydrotreating process of this invention, or it can be used in combination with substantially unpromoted refractory materials, such as alumina, silica, titania, magnesia, metal silicates, metal aluminates, titania and metal phosphates. Alternating layers of the refractory material and the active hydrotreating catalyst composition can be used, or the refractory material can be mixed with the active hydrotreating catalyst composition for better dispersion of the hydrocarbon-containing feed stream.

Fresh hydrotreating catalysts (e.g., NiO/MoO$_3$, CoO/MoO$_3$, CoO/MoO$_3$, NiO/CoO/MoO$_3$, NiO/MoO$_3$/TiO$_2$, and the like; all supported on alumina containing materials) can be used in admixture with the active hydrotreating catalyst composition of this invention to achieve simultaneous demetallization, desulfurization, denitrogenation and hydrocracking, if desired. It is also within the scope of this invention, to use a layer of the active hydrotreating catalyst composition of this invention and one or more layers of fresh hydrotreating catalysts in one reactor (stacked catalyst beds), or to use a reactor containing the active hydrotreating catalyst of this invention in conjunction with one or more reactors in series containing a fresh hydrotreating catalyst, so as to achieve the simultaneous hydrotreating results recited above. Preferably, the active hydrotreating catalyst composition of this invention is used in a top layer and/or in the first reactor, respectively, so as to serve primarily as demetallizing catalyst.

Any suitable reaction time (contact time) between the active hydrotreating catalyst composition of this invention, the hydrocarbon-containing feed stream and hydrogen gas can be utilized. In general, the reaction time will range from about 0.05 hours to about 10 hours, preferably from about 0.4 to about 5 hours. In a continuous fixed bed operation, this generally requires a total liquid hourly space velocity (LHSV; expressed as volume feed per volume catalyst per hour) in the range of about 0.10 to about 10, preferably a LHSV of about 0.2 to about 0.5.

The hydrotreating process employing the active hydrotreating catalyst composition of the present invention can be carried out at any suitable temperature. The temperature will generally be in the range of about 250° C. to about 550° C., and will preferably be in the range of about 300° C. to about 450° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation, but operating at high pressure may be undesirable for safety and economic reasons.

Any suitable quantity of hydrogen can be added to the hydrotreating process of this invention. The quantity of hydrogen used to contact the hydrocarbon containing feed stock will generally be in the range of about 100 to about 10,000 SCFB (standard cubic feed $H_2$ per barrel of the hydrocarbon containing feed stream), and will more preferably be in the range of about 1,000 to about 6,000 SCFB. Either substantially pure hydrogen or a free hydrogen containing gas mixture (e.g., $H_2$ and $CH_4$, or $H_2$ and CO, or $H_2$ and $N_2$) can be used.

In general, the active hydrotreating catalyst composition of this invention is utilized primarily for demetallization and desulfurization in the hydrotreating process process of this invention. The time in which the catalyst composition of this invention will maintain its activity for the above process will depend upon the hydrotreating conditions and the contaminant levels of the hydrocarbon containing feed. Generally, the temperature of the hydrotreating process is gradually increased to compensate for loss of catalyst activity due to fouling (e.g., due to deposition of coke and metals on the catalyst). The active hydrotreating catalyst composition of this invention can, if desired, be regenerated when its activity has dropped below a desired level. Catalyst regeneration can be carried out by regeneration step (d) of this invention or by other suitable (preferably oxidative) regeneration methods.

At least a portion of the hydrotreated product stream of this invention can subsequently be cracked, e.g., in a fluidized catalytic cracking unit, under such conditions as to produce lower boiling hydrocarbon materials suitable for use as fuels and other useful products. It is within the scope of this invention to hydrotreat the product stream having reduced contents of metals and sulfur in a process using a different catalyst composition (such as alumina-supported $NiO/MoO_3$ or $CoO/MoO_3$ catalysts) having a smaller average pore diameter than the regenerated spent catalyst of this invention) for further removal of sulfur and other impurities before the product stream is introduced into a cracking reactor and treated under cracking conditions.

The following examples are presented in further illustration of the invention and are not to be considered as unduly limiting the scope of this invention.

EXAMPLE I

This example illustrates the preparation of an active hydrotreating catalyst composition from a spent hydrotreating catalyst.

A sample of a commercial hydrotreating catalyst (a Co/Mo-promoted alumina catalyst, labeled "X"), which had been used in a commercial oil hydrotreater of a refinery of Phillips Petroleum Company (primarily for removal of sulfur from the oil) and had been discarded when its desulfurization activity had dropped below an acceptable level, was solvent-extracted with toluene, washed with n-pentane and dried at about 100°-120° C. in a vacuum oven for 2 hours (to remove adhered oil and solvent tnerefrom. The dried spent catalyst was sieved, and the fraction which passed through a 50 mesh screen (i.e., the 50+ mesh fraction) was used for preparing the active hydrotreating catalyst composition of this invention.

5.0 grams of the dried 50+ mesh spent catalyst "X" and 21.5 grams of 50+ mesh boehmite alumina (which had been prepared by mixing aqueous solutions of sodium aluminate and aluminum sulfate, recovering the formed alumina precipitate, washing and drying) were added to a mixture of 0.97 grams of Monofax 831 (a commercial phosphoric acid ester surfactant provided by Mona Industries, Paterson, N.J.) and 8.75 grams of distilled water. A thick paste was obtained by stirring the above-described ingredients by means of a spatula. This procedure was repeated for three other batches. The obtained four pasty batches were then extruded in a 1 inch lab-scale extruder through a die having 1/32 inch diameter holes. The extrudates were cut to about 0.1 inch length.

The extrudates were left overnight at room temperature, and were then heated in air for 3 hours at about 900° F. so as to substantially dry the extrudates and to burn off coke deposits on the spent catalyst "X" component. The thus-obtained extruded material is labeled Catalyst Composition A. The surface area of Catalyst Composition A, determined by the BET method using $N_2$, was 303 m$^2$/g. The average pore volume (determined by mercury porosimetry) of Catalyst Composition A was about 1.0 cc/g. The pore distribution of Catalyst Composition A, calcined at 900° F., is shown in the FIG. For comparison, the pore distribution curve for the fresh catalyst "X" is also shown in FIG. 1 (indicating a considerably lower pore volume of fresh catalyst "X" than that of Catalyst Composition A). Catalyst Composition A contained about 0.6 weight-% Co and 1.7 weight-% Mo.

Catalyst Composition A (i.e., extrudate of alumina and spent catalyst "X", having been calcined in air at 900° F.) was then calcined for 16 hours in air at 1470° F. (800° C.), so as to obtain Catalyst Composition B. The BET surface area of Catalyst Composition B was 169 m$^2$/g, and its pore diameter (determined by mercury porosimetry) was 1.15 cc/g. The pore distribution curve for Catalyst Composition B is also shown in FIG. 1. Catalyst Composition B had a higher cumulative surface area and also a higher percentage of pores in the 60–500 Å range than Catalyst Composition B.

EXAMPLE II

This example illustrates the use of a Catalyst Composition B, (comprising alumina and regenerated spent catalyst, having been calcined at 900° F. and then at 1470° F.) for hydrotreating a heavy oil. The hydrotreating tests were carred out in a lab-scale trickle bed hydrotreating reactor. A heavy feedstock (Maya 400F+ residuum) which contained 64 ppmw (parts by weight per million parts by weight of feed) Ni, about 320 ppmw V, 3.9 weight-% sulfur, 14 weight-% and Ramsbottom carbon residue, and had an API gravity (measured at 60° F.) of about 14, was mixed with hydrogen gas and pumped downwardly through a heated, stainless steel trickle bed reactor (28–29 inches long, 0.75 inch inner diameter; fitted inside with a 0.25 inch axial thermocouple). The reactor was filled with a 9 inch high top layer of Alundum ® (α-alumina having a surface area of less than 1 m²/g), a middle layer (about 13 inches high) of a mixture of 30 cc (12.4 grams) of Catalyst Composition B and 60 cc (125 g) Alundum ®; and a 4 inch high bottom layer of Alundum ®. The liquid hydrotreated product was separated from gases, collected in a liquid product separator and analyzed. Nickel and vanadium contents were measured by plasma emission analysis, sulfur content was measured by X-ray fluorescence spectrometry, and Ramsbottom carbon residue was measured in accordance with ASTM D524.

An accelerated hydrotreating test was carried out for about 6 weeks at about 750° F., 2250 psig total pressure, oil feed rate (LHSV) of 1.67 cc oil per cc Catalyst Composition B per hour, and a hydrogen feed rate of 3500 SCFB (standard cubic feet per barrel oil). During the first 10 days of the test run, the average removal of metals (Ni+V) was about 66%, and the average removal of sulfur was about 31%. At the end of the run (i.e., after about 5–6 weeks on stream), the average removal of metals was still about 63%, whereas the average sulfur removal had dropped to about 25%.

These test results indicate that Catalyst Composition B (which had been calcined at 900° F. and then at 1470° F.) was particularly effective as a hydrodemetallization catalyst and had a demetallization activity comparable to that of fresh commercial hydrodemetallization catalysts. Based on these test results, it is concluded that Catalyst Composition A (calcined at 900° F.) is also an effective hydrodemetallization catalyst.

Reasonable variations, modifications and adaptations for various usages and conditions can be made within the scope of the disclosure and the appended claims, without departing from the scope of this invention.

We claim:

1. A process for preparing an active hydrotreating catalyst composition from a spent hydrotreating catalyst composition comprising the steps of:
   (a) grinding a substantially dry spent hydrotreating composition comprising (i) an alumina-containing support material, (ii) at least one compound of at least one metal selected from the group consisting of molybdenum, tungsten, nickel and cobalt, and (iii) solid carbonaceous deposits;
   (b) mixing the ground spent hydrotreating catalyst composition obtained in step (a) with alumina;
   (c) shaping the mixture obtained in step (b) into compacted particles comprising said ground spent hydrotreating catalyst composition and said alumina; and
   (d) heating the compacted particles obtained in step (c) in a free oxygen containing gas to a temperature in the range of from about 700° to about 1000° F., under such conditions as to substantially convert said solid carbonaceous deposits to carbon oxides, and to obtain an active hydrotreating catalyst composition.

2. A process in accordance with claim 1, wherein the weight ratio of component (iii) to the sum of components (i) and (ii) in said substantially dry spent hydrotreating catalyst composition, used in step (a), is in the range of from about 1:1000 to about 1:1.

3. A process in accordance with claim 1, wherein in step (a) said substantially dry spent hydrotreating catalyst composition is ground to a particle size in the range of from about 40 to about 250 mesh.

4. A process in accordance with claim 1, wherein said alumina, used in step (b), has a particle size of about 50 to about 325 mesh and a surface area of about 50 to about 350 m²/g.

5. A process in accordance with claim 1, wherein the weight ratio of said ground spent hydrotreating catalyst composition to said alumina in step (b) is in the range of from about 1:50 to about 1:1.

6. A process in accordance with claim 1 wherein water is present in step (b).

7. A process in accordance with claim 1, wherein shaping step (c) comprises extruding said mixture through at least one die and subsequently cutting at least one extruded strand.

8. A process in accordance with claim 6, wherein step (d) is carried out after the compacted particles obtained in step (c) have been substantially dried.

9. A process in accordance with claim 8, wherein said compacted particles have been substantially dried by heating at a temperature of about 200°–300° F.

10. A process in accordance with claim 1, wherein said active hydrotreating catalyst composition obtained in step (d) has a surface area of about 50 to about 300 m²/g, a pore volume of about 0.5 to about 1.5 cc/g, and an average pore diameter of about 50 to about 500 Å.

11. A process in accordance with claim 1, wherein in said active hydrotreating catalyst composition obtained in step (d) the volume of pore in the 60–500 Å diameter range account for about 30–90 percent of the total pore volume.

12. A process in accordance with claim 1, wherein said active hydrotreating catalyst composition contains about 0.5 to about 10 weight-% of said at least one metal.

13. A process for preparing an active hydrotreating catalyst composition from a spent hydrotreating catalyst composition comprising the steps of:
   (a) grinding a substantially dry spent hydrotreating composition comprising (i) an alumina-containing support material, (ii) at least one compound of at least one metal selected from the group consisting of molybdenum, tungsten, nickel and cobalt, and (iii) solid carbonaceous deposits;
   (b) mixing the ground spent hydrotreating catalyst composition obtained in step (a) with alumina;
   (c) shaping the mixture obtained in step (b) into compacted particles comprising said ground spent hydrotreating catalyst composition and said alumina;
   (d) heating the compacted particles obtained in step (c) in a free oxygen containing gas to a temperature in the range of from about 700° to about 1000° F., under such conditions as to substantially convert said solid carbonaceous deposits to carbon oxides; and (e) heating the material obtained in step (d) at a temperature which is higher than the maximum temperature employed in step (d), at such heating conditions as to obtain an active hydrotreating catalyst composition containing a larger portion of pores in the 60–500 Å pore diameter range than the material obtained in step (d).

14. A process in accordance with claim 13, wherein the temperature in step (e) is in the range of from about 1000° to about 1800° F.

15. A process accordance with claim 13, wherein step (e) is carried out for a period of time in the range of from about 10 minutes to about 24 hours.

16. A process in accordance with claim 14, wherein said temperature in step (e) is in the range of from about 1100° to about 1700° F.

17. A process in accordance with claim 16, wherein step (e) is carried out for a period of time in the range of from about 1 to about 5 hours.

18. A process in accordance with claim 13 wherein step (e) is carried out in a free oxygen containing gas atmosphere.

19. A process in accordance with claim 13, wherein the weight ratio of component (iii) to the sum of components (i) and (ii) in said substantially dry spent hydrotreating catalyst composition, used in step (a), is in the range of from about 1:1000 to about 1:1.

20. A process in accordance with claim 13, wherein the step (a) said substantially dry spent hydrotreating catalyst composition is ground to a particle size in the range of from about 40 to about 250 mesh.

21. A process in accordance with claim 13, wherein said alumina, used in step (b), has a particle size of about 50 to about 325 mesh and a surface area of about 50 to about 350 $m^2/g$.

22. A process in accordance with claim 13, wherein the weight ratio of said ground spent hydrotreating catalyst composition to said alumina in step (b) is in the range of from about 1:50 to about 1:1.

23. A process in accordance with claim 13, wherein water is present in step (b).

24. A process in accordance with claim 23, wherein step (d) is carried out after said compacted particles obtained in step (c) have been substantially dried.

25. A process in accordance with claim 24, wherein said compacted particles have been substantially dried by heating at a temperature of about 200°–300° F.

26. A process in accordance with claim 13, wherein shaping step (c) comprises extruding said mixture through at least one die and subsequently cutting at least one extruded strand.

27. A process in accordance with claim 13, wherein the material obtained in step (d) has a surface area of about 50 to about 300 $m^2/g$, a pore volume of about 0.5 to about 1.5 cc/g, and an average pore diameter of about 0 to about 500 Å.

28. A process in accordance with claim 13, wherein in said material obtained in step (d) the volume of pores in the 60–500 Å diameter range accounts for about 30–90 percent of the total pore volume.

29. A process in accordance with claim 13, wherein said active hydrotreating catalyst composition obtained in step (e) contains about 0.5 to about 10 weight-% of said at least one metal.

30. A process in accordance with claim 13, wherein said active hydrotreating catalyst composition obtained in step (e) has a surface area in the range of from about 50 to about 300 $m^2/g$, a pore volume in the range of from about 0.5 to about 1.5 cc/g, and an average pore diameter in the range of from about 50 to about 500 Å.

31. A process in accordance with claim 30, wherein the said active hydrotreating catalyst composition has a surface area in the range of from about 100 to about 200 m/g, a pore volume in the range of from about 0.8 to about 1.2 cc/g, and an average pore diameter in the range of from about 100 to about 300 Å.

32. A process in accordance with claim 30, wherein in said active hydrotreating composition the percentage of pores of 60–500 Å diameter is in the range of from about 35 to about 95 percent of the total pore volume.

* * * * *